United States Patent
Tran

(10) Patent No.: US 6,637,076 B2
(45) Date of Patent: Oct. 28, 2003

(54) FABRICATED STEEL LUG PIPE REPAIR CLAMP

(76) Inventor: Hai Tran, 5828 Naylor Ave., Livermore, CA (US) 94550

( * ) Notice: Subject to any disclaimer, the term of this patent is extended or adjusted under 35 U.S.C. 154(b) by 0 days.

(21) Appl. No.: 10/051,071

(22) Filed: Jan. 22, 2002

(65) Prior Publication Data

US 2003/0135962 A1 Jul. 24, 2003

(51) Int. Cl.[7] .................... F16L 17/00; F16L 23/00
(52) U.S. Cl. ................................ 24/279; 138/99
(58) Field of Search ................ 24/279; 285/367, 285/112, 373

(56) References Cited

U.S. PATENT DOCUMENTS

| | | | | |
|---|---|---|---|---|
| 2,998,629 A | * | 9/1961 | Smith | 24/279 |
| 3,088,185 A | * | 5/1963 | Smith | 24/279 |
| 3,089,212 A | * | 5/1963 | Graham et al. | 24/279 |
| 3,175,267 A | | 3/1965 | Graham | |
| 3,195,205 A | | 7/1965 | Morris, Jr. et al. | |
| 3,692,062 A | * | 9/1972 | Dunmire | 138/99 |
| 3,737,959 A | * | 6/1973 | Smith et al. | 24/279 |
| 4,606,377 A | * | 8/1986 | Montgomery | 138/99 |
| 4,630,647 A | * | 12/1986 | Thomson | 138/99 |

* cited by examiner

Primary Examiner—Robert J. Sandy
(74) Attorney, Agent, or Firm—Richard C. Litman

(57) ABSTRACT

A fabricated steel pipe repair clamp having a steel band and interlocking steel lugs having respective tension bars and tightening bolts or studs forming the tightening assembly. The tightening assembly comprises a welded stud lug assembly, and a tension bar lug welded assembly, each having a base plate, and a backup plate. The two folded terminals of the clamping metal band are welded between the base plate and the backup plate forming the respective lug bodies. The laminated weld forming the lug assembly results in a stronger lug body backup plate and provides an even clamping force. An alternative embodiment combines the base plate and the backup plate connected to form jaws. Another embodiment employs an offset backup plate to form the lugs to receive the band ends in a recess formed between the tensioner bars and between the studs shank portions.

15 Claims, 4 Drawing Sheets

FABRICATED STEEL LUG PIPE REPAIR CLAMP

BACKGROUND OF THE INVENTION

1. Field of the Invention

The present invention relates to pipeline repair clamps. More particularly, the present invention relates to fabricated steel lug pipeline repair clamps.

2. Description of the Related Art

Repair clamps for easy repair of leaks developed in pipes are widely used for at least temporary repair. Such designs typically include a sealing gasket with an encircling band of steel held at either end by a tightening device. Prior designs capable of maintaining a seal in an industrial environment without bunching of the sealing gasket suffer from one or more shortcomings, such as the ability to maintain a secure grip on the steel band when tightened. These designs typically employ overlapping lugs, one having a base bearing at least one tension bar and one having a base bearing tightening bolts, each having a main body incorporating grippers mechanically pressed closed over the respective ends of the steel band during assembly, resulting in fractures in the grippers which eventually fail. Prior designs require substantial clearance for installation, which may not be available around an installed pipe. Prior designs that provide acceptable sealing are relatively costly to construct. It would be desirable to provide a low profile tension bar and tightening bolt lug-type pipe repair clamp which is effective, simple in construction, and inexpensive to construct.

U.S. Pat. No. 3,175,267, issued Mar. 30, 1965, to Graham describes a pipe clamp having a tightening assembly and a metal band with opposite folded ends. The folded ends are inserted and extended beyond the jaws, each end being bent down to form a locking tab against the jaws, thereby preventing any movement or slippage of the band when a tightening force is applied.

U.S. Pat. No. 3,195,205, issued Jul. 20, 1965, to Morriss, Jr., et al. describes a pipe clamp having a hardened silicon carbide grit in the recesses of the jaws to firmly hold the folded ends of the metal band and to prevent the band from movement during the application of a tightening force.

U.S. Pat. No. 3,692,062, issued Sep. 9, 1972, to Dunmire describes a pipe repair clamp wherein the ends of the band are welded to the lug base portion using spot weld and plug welds.

None of the above inventions and patents, taken either singularly or in combination, is seen to describe the instant invention as claimed. Thus, a fabricated steel lug repair clamp solving the aforementioned problems is desired.

SUMMARY OF THE INVENTION

The present invention is a fabricated steel pipe repair clamp having a steel band and interlocking steel lugs having respective tension bars and tightening bolts or studs forming the tightening assembly. The tightening assembly comprises a welded stud lug assembly, and a tension bar lug welded assembly, each having a base plate, and a backup plate. The two folded terminals of the clamping metal band are welded between the base plate and the backup plate forming the respective lug bodies. The laminated weld forming the lug assembly results in a stronger lug body backup plate and provides an even clamping force. An alternative embodiment combines the base plate and the backup plate connected to form jaws. Yet another embodiment employs only backup plates to form the lugs, the backup plates being offset to receive the respective band ends being located between the backup plate and the tensioner bars and between the studs and their backup plate, respectively.

Accordingly, it is a principal object of the invention to provide a pipe repair clamp with is simple in design, low in profile, and sturdy in construction.

It is another object of the invention to provide a pipe repair clamp as above having fabricated steel lug bodies.

It is a further object of the invention to provide a pipe repair clamp as above wherein said fabricated steel lug bodies are sandwiched base plates and a backup plates with respectively folded over steel band ends welded therebetween.

Still another object of the invention is to provide a pipe repair clamp as above wherein the base plate and the backup plate are connected, forming a jaw.

Yet another object of the invention is to provide a pipe repair clamp as above wherein the base plate and the backup plate are a single plate offset so as to form band end receiving grooves with respective tensioner bars and tightening studs.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a fabricated steel pipe repair clamp having a steel band and interlocking steel lugs having respective, tension bars and tightening bolts or studs forming the tightening assembly. The tightening assembly comprises a welded stud lug assembly, and a tension bar lug welded assembly, each having a base plate, and a backup plate. The two folded terminals of the clamping metal band are welded between the base plate and the backup plate forming the respective lug bodies. The laminated weld forming the lug assembly results in a stronger lug body backup plate and provides an even clamping force. An alternative embodiment combines the base plate and the backup plate connected to form jaws. Yet another embodiment employs only backup plates to form the lugs, the backup plates being offset to receive the respective band ends being located between the backup plate and the tensioner bars and between the studs and their backup plate, respectively. The inventive structures provide a strong baseplate and distribute strong and evenly distributed clamping force.

In the following description, the forms of the terms radial, axial and tangential refer to the pipe being repaired, and the term inner refers to the mutually facing portions of the lugs, the term outer meaning the opposite thereof.

Figure 1:
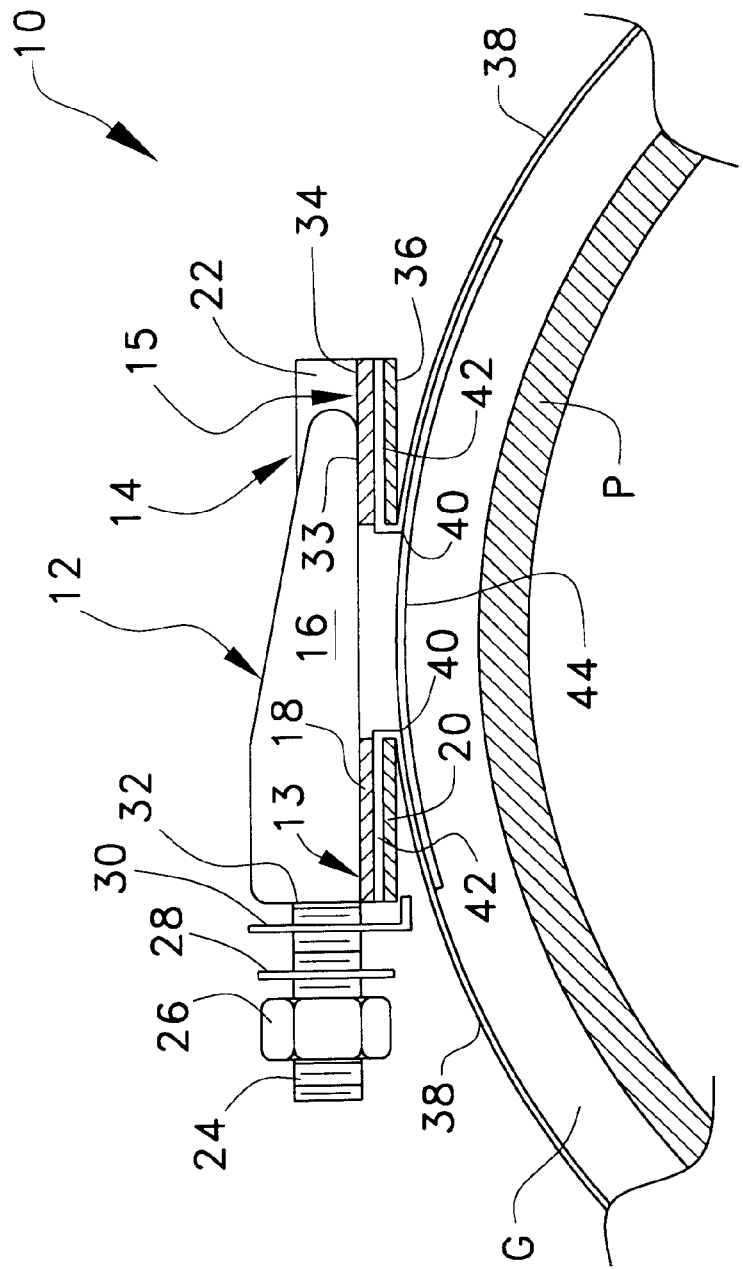
FIG. 1 is a view in elevation and cross section illustrating a pair of pipe clamp lugs of a pipe clamp formed to sandwich folded over opposing steel band ends to for respective lug bodies according to the present invention.
Figure 2:
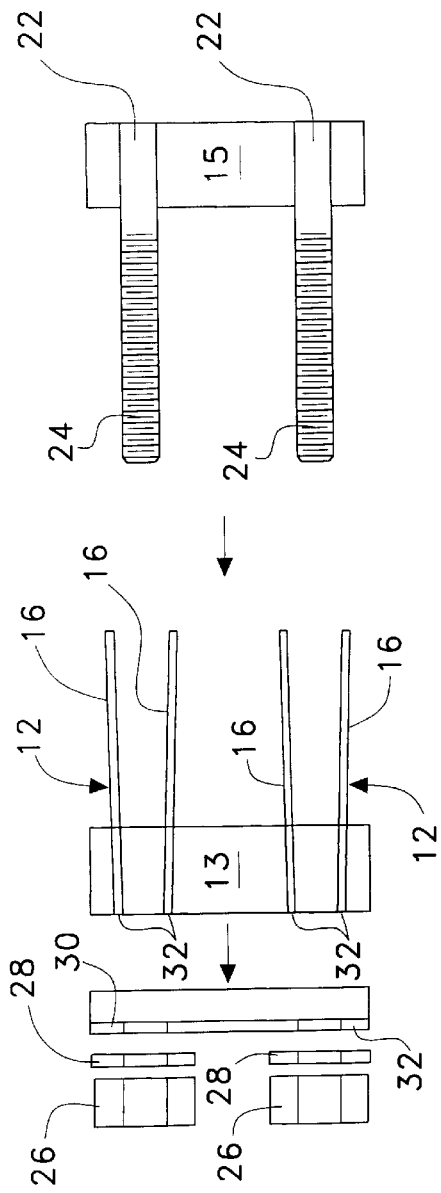
FIG. 2 is an exploded plan view of the pipe clamp of FIG. 1.
Figure 3:
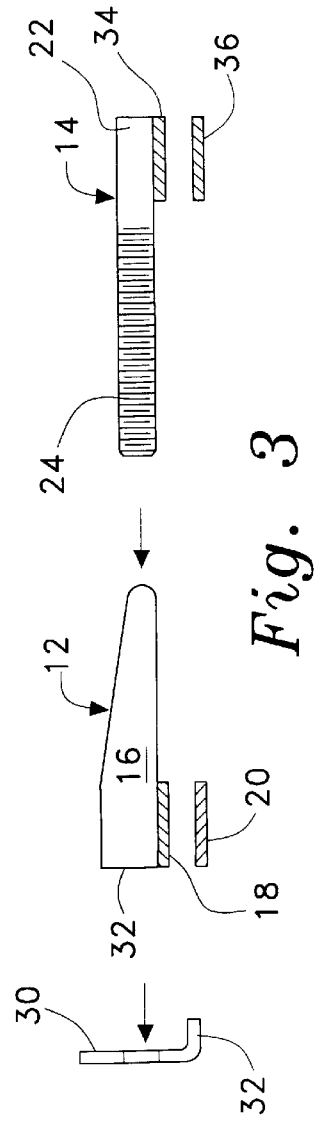
FIG. 3 is an exploded elevation view of the pipe clamp of FIG. 1 showing opposing tensioner bar lugs and tightening stud lugs of the pipe clamp of FIG. 1 with their respective base plate and backup plate lug bodies.

Referring to FIGS. 1–3, there are shown an elevational sectional view, an exploded plan view, and an exploded elevational sectional view, respectively of the inventive pipe clamp assembly. Pipe clamp assembly 10 comprises tensioner bar lug 12 and stud lug 14. Tensioner bar lug 12 comprises tensioner bar lug body 13 and tensioner bars 16. Tensioner bar lug body 13 is axially and generally tangentially mounted transverse to and along the base of tensioner bars 16 and comprise tensioner bar base plate 18 and coextensive tensioner bar backup plate 20.

Stud lug 14 comprises stud lug body 15 and studs 22. Stud lug body 15 is axially and generally tangentially mounted transverse to and underneath studs 22 and comprises stud assembly base plate 34 and coextensive stud assembly backup plate 36. Studs 22 shank ends with respective threaded ends 24 project between pairs of tensioner bars 20 upon assembly of pipe clamp assembly 10 around a pipe P.

Tightening nuts 26, upon tightening along stud threaded ends 24, bear against washers 28, which bear against axial washer bar 30 which extends between stud threaded ends 24, which in turn bear against tensioner bar bearing faces 32. Tensioner bar lug 12 and stud lug 15 are so sized and configured as to interlock and tighten steel band 38 around pipe P upon tightening nuts 26. As nuts 26 are tightened, tensioner bars 16 bear against and slides along stud lug body 15 at tensioner bar lug bearing surface 33.

Steel band 38 has opposing folded ends 42 folded at folds 40 around inner edges of respective backup plates 20 and 36 and welded together therewith along with base plates 18 and 34 to form sandwiched tensioner bar lug body 13 and stud lug body 15.

As shown in FIG. 1, a pipe P is shown in cross section having a surrounding sealing gasket G. A bridge plate 44 covers gasket G to bridge the portion where the tensioner bar lug 12 and the stud lug 14 move relative to each other when tightened or loosened, thus avoiding bunching of the gasket.

Figure 4:
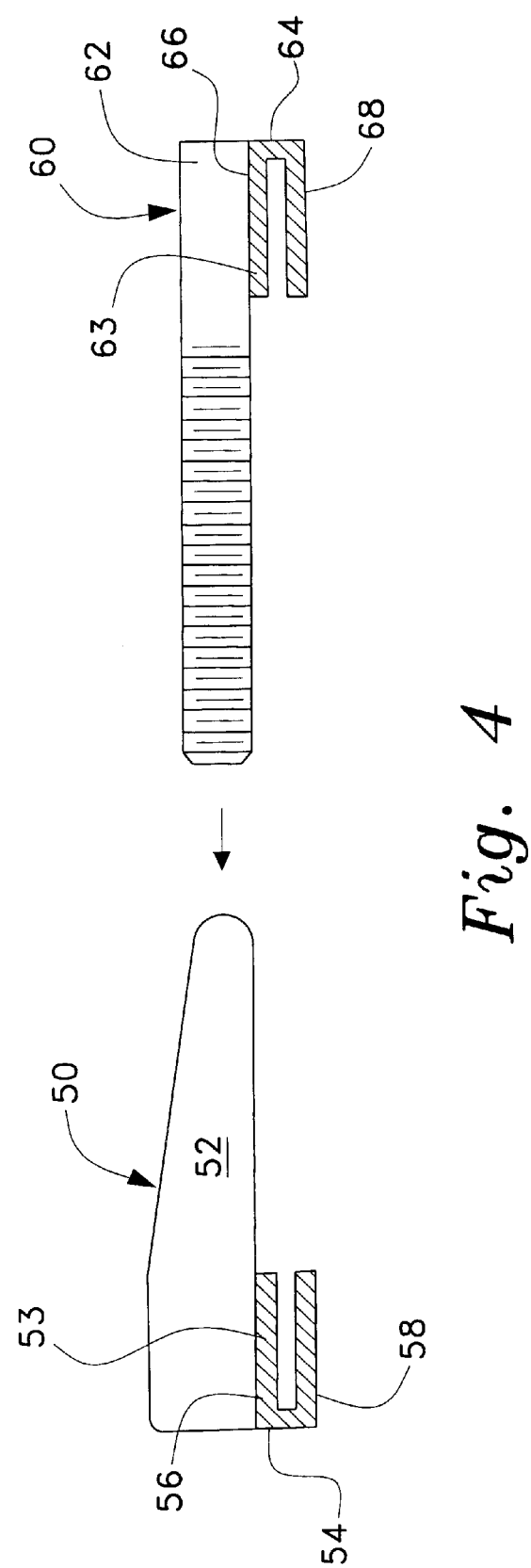
FIG. 4 is an exploded elevation view of tensioner bar and stud lugs of an alternative embodiment of the pipe clamp similar to that of FIG. 3 having respective base plates and backup plate lugs formed into an opening slot to receive respective steel band ends, thus forming respective lug bodies.

Referring to FIG. 4, there is shown an alternative embodiment of the tensioner bar lug and the stud lug of the present invention wherein tensioner bar lug 50 comprises tensioner bar 52 having a transverse tensioner bar lug body 53 forming a slot for receiving the steel band end (not shown). The slot is formed by coextensive base plate 56 and backup plate 58 connected along their mutual outer edge by slot connector 54. The steel band folded end 42 (see FIG. 1) is inserted into the slot and the assembly welded together to form tensioner bar lug body 53. Similarly, the stud lug 60 comprise studs 62 having a transverse stud lug body 63 forming a slot for receiving the steel band end (not shown). The slot is formed by coextensive base plate 66 and backup plate 68 connected along their mutual outer edge by slot connector 64. The steel band folded end 42(see FIG. 1) is inserted into the slot and the assembly welded together to form stud lug body 63. The combined base plate and backup plate may be formed in one piece by extruding or forming.

Figure 5:
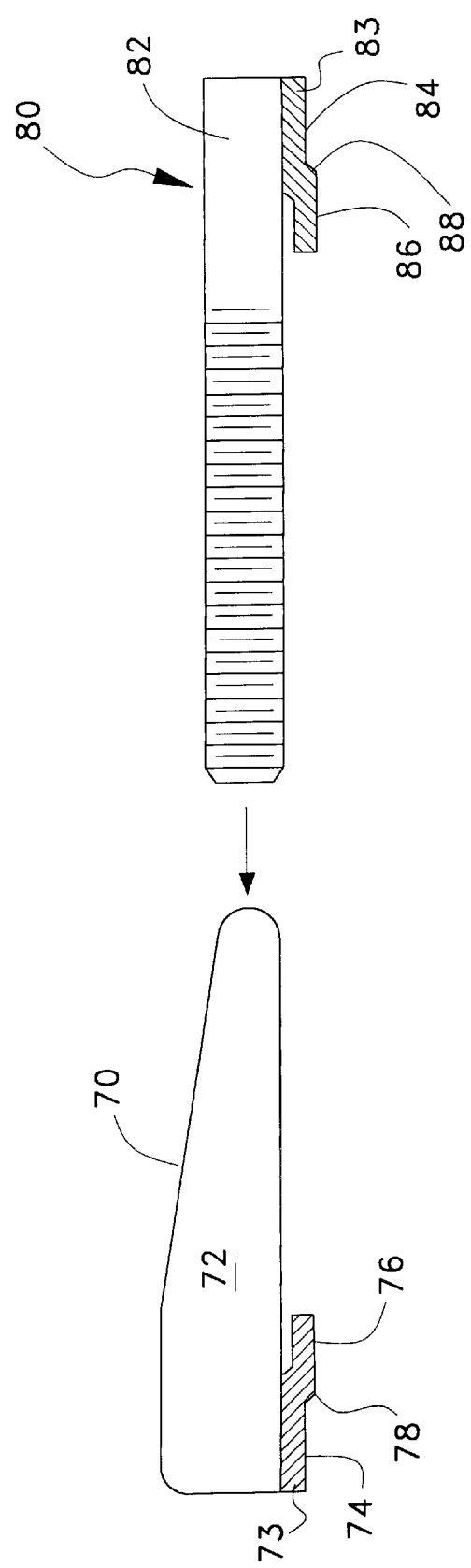
FIG. 5 is an exploded elevation view of a tensioner bar and stud lugs of yet another embodiment of the pipe clamp similar to that of FIG. 3 having only a base plate which is offset to form respective opening recesses between the tensioner bar and the stud to receive respective steel band ends, thus forming respective lug bodies.

Referring to FIG. 5, there is shown another alternative embodiment of the tensioner bar lug and the stud lug of the present invention wherein tensioner bar lug 70 comprises tensioner bars 72 having transverse tensioner bar lug body 73 forming a recess for receiving the steel band end (not shown). The recess is formed by a lug outer tensioner bar base plate portion 74 and a lug inner tensioner bar backup plate portion 76 offset from tensioner bar 72 by tensioner bar lug offset 78 forming an inner recess. The steel band folded end 42 (see FIG. 1) is inserted into the offset and the assembly welded to form tensioner bar lug body 73. Similarly, stud lug 80 comprises studs 82 having a transverse stud lug body 83 forming a recess for receiving the steel band end(not shown). The recess is formed by a lug outer stud base plate portion 84 and a lug inner stud backup plate portion 86 offset from stud 72 by stud lug offset 88 forming an inner recess. The steel band folded end 42 (see FIG. 1) is inserted into the offset and the assembly welded to form stud assembly lug body 83. The combined base plate and backup plate may be formed in one piece by extruding or forming.

In operation, gasket G is placed around pipe P and bridge plate 44 is placed over the leaking portion of pipe P. Pipe clamp assembly 10 is placed around pipe P such that tensioner bar lug 12 and stud lug 14 mutually overlap (see FIG. 3) such that tensioner bars 16 bear on the upper surface of stud lug body 15 and studs 22 bear on the upper surface of tensioner bar lug body 13. Studs 22 are placed such that they rest in between pairs of tensioner bars 16 and upon tensioner bar lug body 13. Tightening nuts 26 then screwed onto the threaded end 24 of studs 22 until snug against tensioner bar bearing faces 32 while positioning repair clamp assembly 10 over the center of bridge plate 44. Nuts 26 are then tightened so as to draw tensioner bar lug body 13 and stud lug body 15 toward each other, thus pulling opposite ends of steel band 38 toward each other until band 38 is sufficiently tight around seal gasket G to assure sealing of the leak in pipe P.

The inventive pipe repair clamp is preferably made of steel. The tensioner bar lug and the stud lug may be formed by welding. The laminated weld between the base plate and the backup plate may be of the spot weld, the Tig weld, fusion bonding, Mig welding, or other method.

It is to be understood that the present invention is not limited to the embodiments described above, but encompasses any and all embodiments within the scope of the following claims.

I claim:

1. A fabricated steel interlocking lug pipe repair clamp comprising:

a tensioner bar lug having at an axially and generally tangentially disposed body and at least one pair of tangentially disposed, radially oriented tensioner bars, said tensioner bars having an outer portion and a lug bearing surface portion; the outer portion of which are transversely mounted upon said body a stud lug having an axially disposed body spaced from said tensioner bar lug body and at least one tangentially disposed stud having a shank portion and a threaded portion, the shank portion being transversely mounted upon the body said stud lug;

a metal band of such length as to substantially encircle a pipe and having opposing end portions securably attachable in respective said tensioner bar lug and said stud lug; and means for mutually drawing each said interlocking lug body in a mutually closing direction;

each said axially disposed lug body comprising;

a planar, elongated base plate, having an outer edge and an inner portion, wherein said base plate has a central lengthwise offset, the inner portion of said base plate functioning as a backup plate, thereby forming a recess between respective tensioner bars and stud shank portions for receiving said band end portions;

a planar backup plate coextensive with said base plate; and a corresponding one of said opposing metal band end portions securely sandwiched between said corresponding base plates and said corresponding backup plates of said tensioner bar lug and said stud lug as by welding;

whereby, upon drawing said lugs together, each said tensioner bar bearing face bears against the upper surface of said stud lug body and said threaded end of said stud bears against the upper surface of said tensioner bar lug body.

2. The clamp of claim 1, wherein each said metal band is folded around an inner side of said corresponding backing plate and a bridge plate so as to bridge the gap between said band opposing end portions.

3. The clamp of claim 1, further comprising a gasket disposed around said pipe between said pipe and said clamp.

4. The clamp of claim 1, wherein said drawing means comprises a tightening nut disposed on said stud on said threaded portion and a bearing surface located on respective outer ends of said pair of tensioner bars.

5. The clamp of claim 4, wherein said drawing means further comprises a washer located between said tightening nut and said bearing surfaces.

6. The clamp of claim 5, wherein said drawing means further comprises a washer bar located between said washer and said bearing surfaces, said washer bar having an inward bend so as to extend below said tensioner bar lug body.

7. The clamp of claim 6, comprising at least two pairs of said tensioner bars and a corresponding number of studs, each pair of tensioner bars surrounding one of said stud.

8. The clamp of claim 1, further comprising a slot connector connecting each said base plate and said backup plate along their respective edges to form jaws adapted to envelop said band end portions.

9. The clamp of claim 1, wherein said clamp is made of steel.

10. A fabricated steel interlocking lug pipe repair clamp comprising:

a tensioner bar lug having an axially and generally tangentially disposed body and two pair of tangentially disposed, radially oriented tensioner bars, said tensioner bars having and outer portion and a lug bearing surface portion, the outer portion of which are transversely mounted at a right angle upon said body;

a stud lug having an axially disposed body spaced from said tensioner bar lug body and two tangentially disposed studs, each stud having a shank portion and a threaded portion, said shank portions being transversely mounted at a right angle upon said body of the stud lug;

a metal band of such length as to substantially encircle a pipe and having opposing end fold portions secured within respective said tensioner bar lug and said stud lug;

a tightening nut located on each said stud threaded end;

a washer located on each said stud threaded end and inboard of said tightening nut;

an axially extending washer bar located on both said stud threaded ends and inboard of said washers, said washer bar having an inward bend portion which, upon tightening of said nut extends below said tensioner bar lug body;

each said axially disposed lug body comprising:

a planar, elongated base plate having and outer edge and an inner portion, wherein said base plate has a central lengthwise offset, the inner portion of said base plate functioning as a backup plate, thereby forming a recess between respective tensioner bars and stud shank portions for receiving said band end fold portions;

a planar backup plate coextensive with said base plate; and a corresponding one of said opposing metal band end fold portion securely sandwiched between said corresponding base plates and said corresponding backup plates of said tensioner bar lug and said stud lug as by welding;

said metal band fold portion being folded around an inner side of a said corresponding backing plate;

whereby, upon tightening said nuts said lugs are drawn together, each said tensioner bar bearing face bears against the upper surface of each said stud lug body and each said threaded end of said stud bears against the upper surface of said tensioner bar lug body.

11. The clamp of claim 10, wherein said clamp is made of steel.

12. The clamp of claim 10, further comprising a gasket disposed around said pipe between said pipe and said clamp and a bridge plate disposed between said gasket and said lugs so as to bridge the gap between said band opposing fold end portions.

13. The clamp of claim 10, further comprising a slot connector connecting each said base plate and said backup plate along their respective outer edges to form jaws adapted to envelop said respective band end fold portions.

14. The clamp of claim 13, wherein said jaws are formed by extrusion.

15. The clamp of claim 10, wherein said offset base plate and backup plate are formed by extrusion.

* * * * *